No. 755,421. PATENTED MAR. 22, 1904.
B. B. WEAVER.
VEHICLE WHEEL.
APPLICATION FILED DEC. 12, 1903.
NO MODEL. 4 SHEETS—SHEET 3.

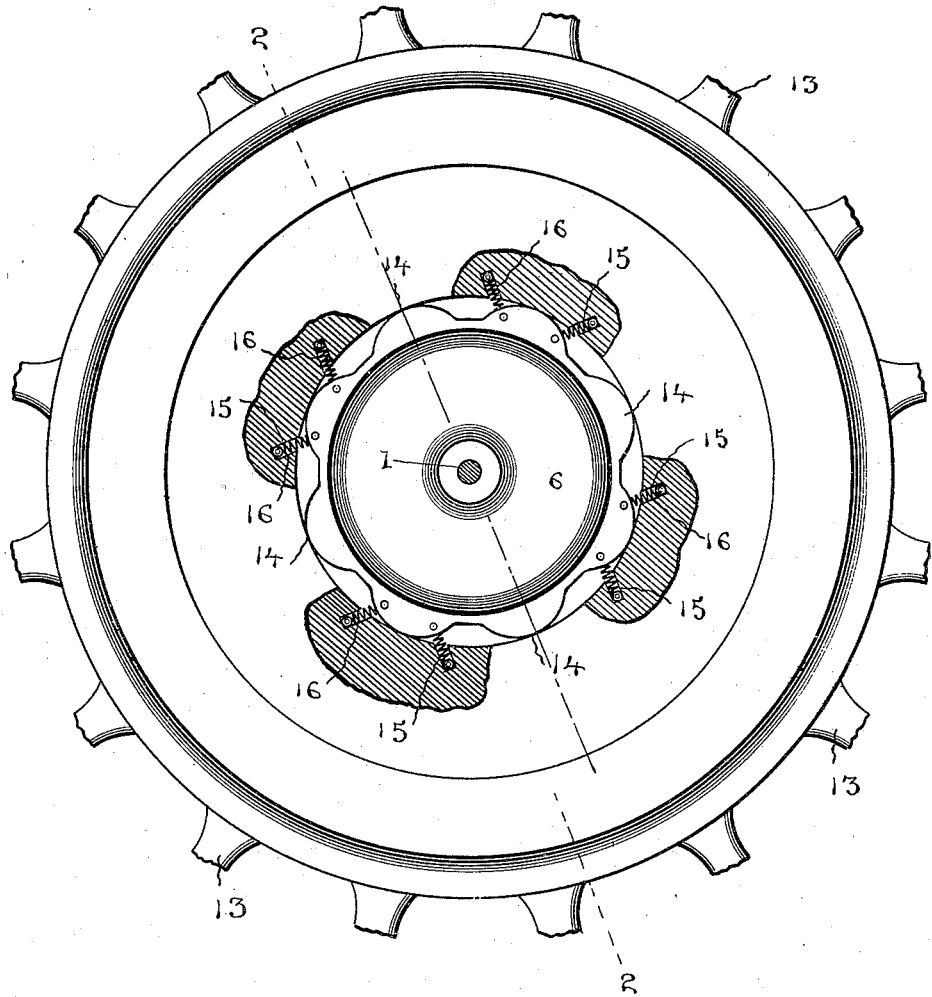

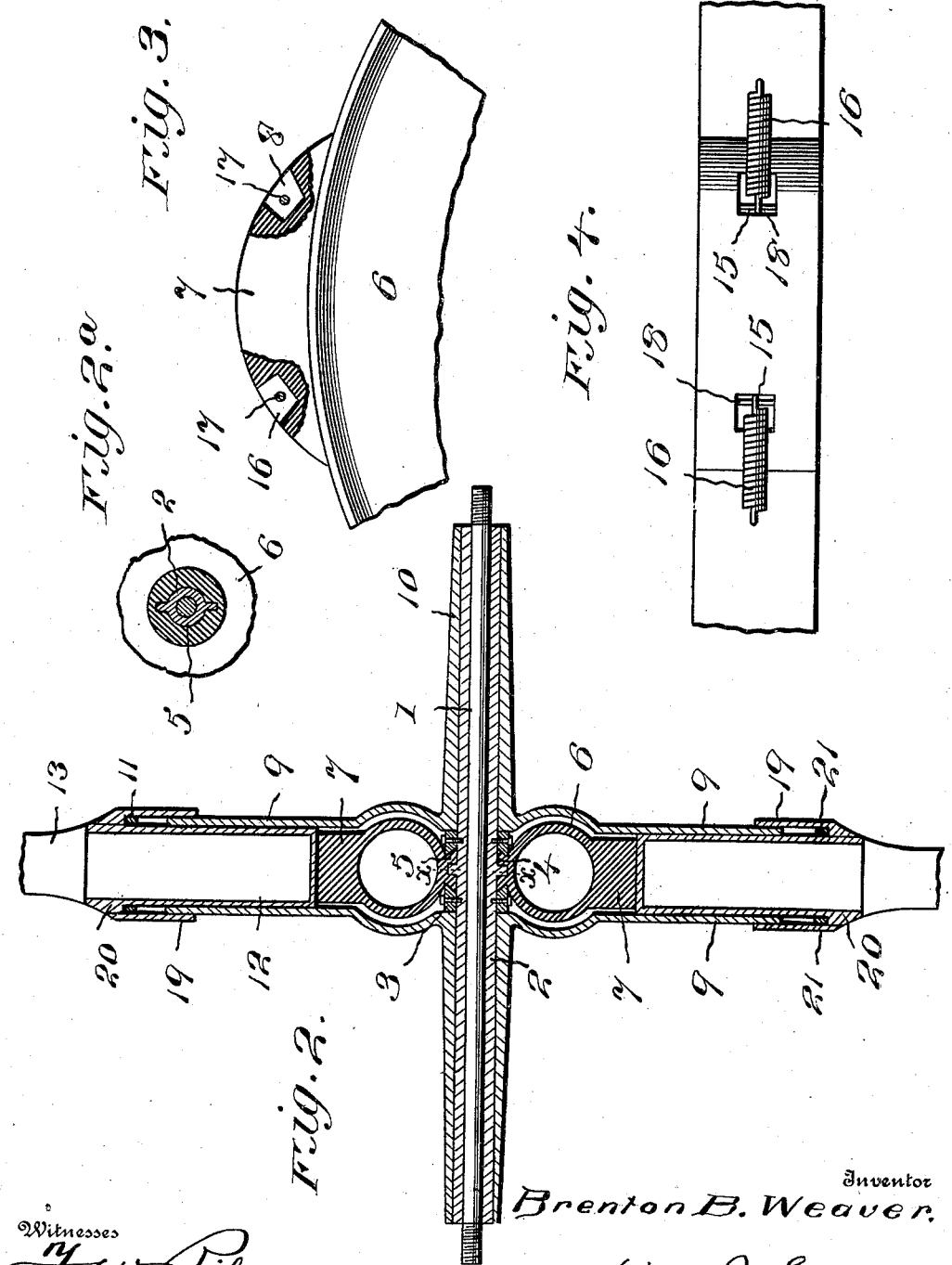

Witnesses Inventor
B. B. Weaver.
By Victor J. Evans
Attorney

No. 755,421. PATENTED MAR. 22, 1904.
B. B. WEAVER.
VEHICLE WHEEL.
APPLICATION FILED DEC. 12, 1903.
NO MODEL. 4 SHEETS—SHEET 4.

Witnesses
F. W. Riley
Hubert D. Lawson

Inventor
Brenton B. Weaver
By Victor J. Evans
Attorney

THE NORRIS PETERS CO., PHOTO-LITHO., WASHINGTON, D. C.

No. 755,421. Patented March 22, 1904.

UNITED STATES PATENT OFFICE.

BRENTON B. WEAVER, OF GLACE BAY, CANADA.

VEHICLE-WHEEL.

SPECIFICATION forming part of Letters Patent No. 755,421, dated March 22, 1904.

Application filed December 12, 1903. Serial No. 184,989. (No model.)

*To all whom it may concern:*

Be it known that I, BRENTON B. WEAVER, a subject of the King of England, residing at Glace Bay, Cape Breton, Nova Scotia, Canada, have invented new and useful Improvements in Vehicle-Wheels, of which the following is a specification.

My invention relates to new and useful improvements in vehicle-wheels especially adapted for use upon automobiles and other similar vehicles; and its object is to provide a hub having resilient devices therein whereby the use of the ordinary pneumatic or other resilient tire can be dispensed with.

A further object is to provide a hub which is of simple and inexpensive construction and the parts of which are so arranged as to prevent jarring of the axle and the parts supported thereby when the wheel passes over uneven surfaces.

A further object is to provide means for holding the resilient portions of the hub in proper position at all times.

With the above and other objects in view the invention consists in the novel construction and combination of parts hereinafter more fully described and claimed, and illustrated in the accompanying drawings, showing the preferred form of my invention, and in which—

Figure 5:
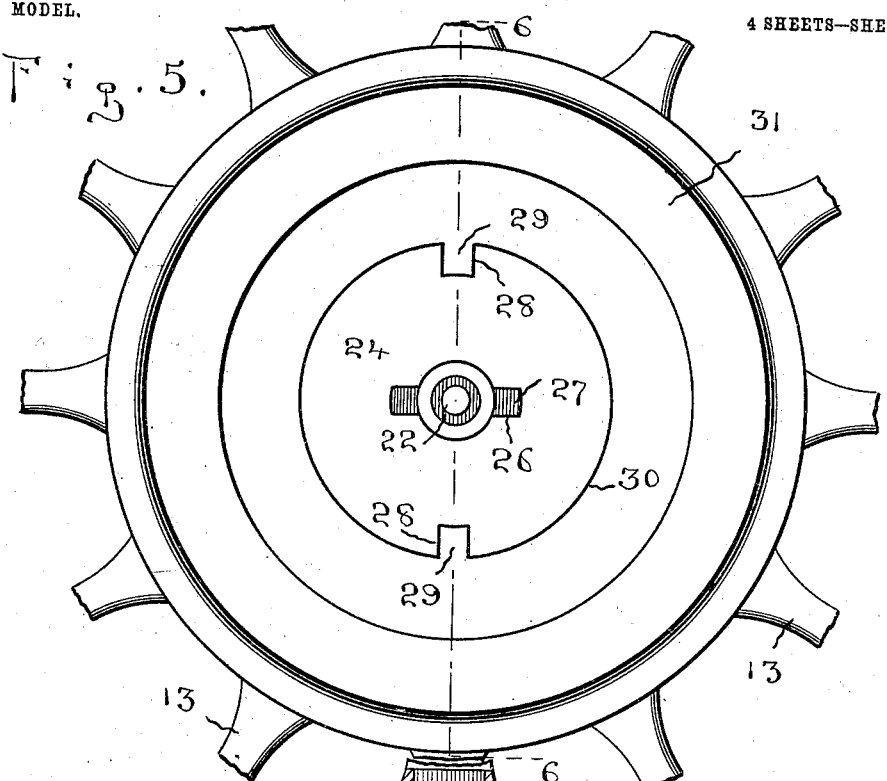
Figure 6:
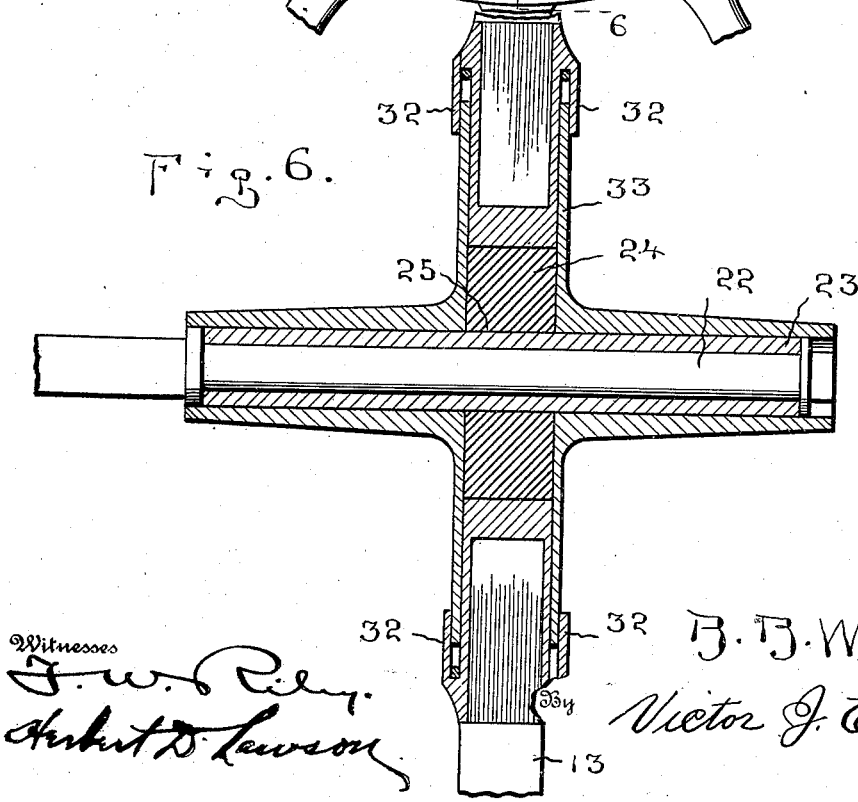
Figure 7:
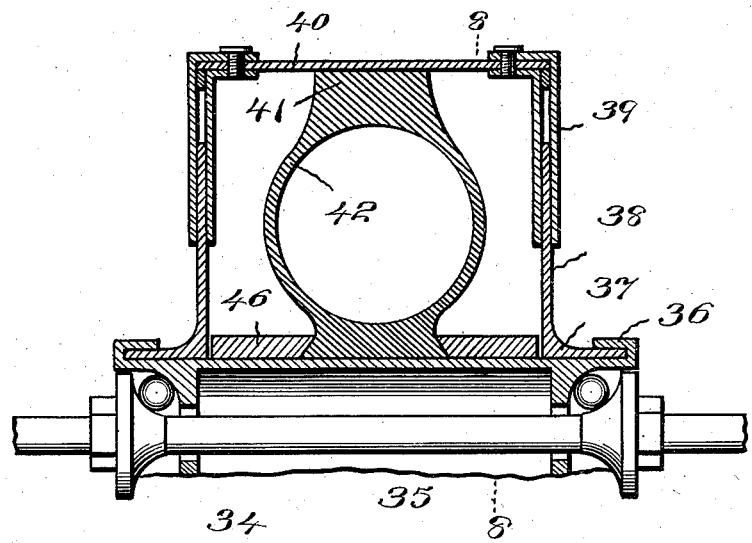
Figure 8:
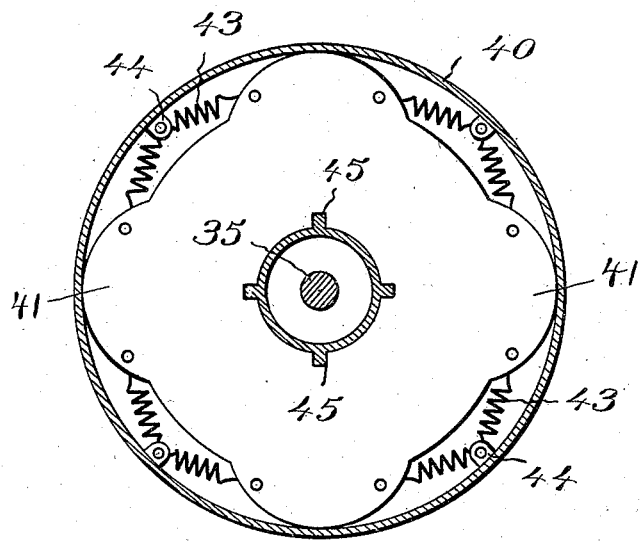

Figure 1 is a side elevation of the hub of a wheel, the same being broken away to show the tube in position therein. Fig. 2 is a section on line 2 2, Fig. 1. Fig. 2$^a$ is a section on line $x$ $x$, Fig. 2. Fig. 3 is a detail view of a portion of the tube and showing one of its ears extending therefrom. Fig. 4 is an elevation of a portion of the hub and showing holding-springs secured therein. Fig. 5 is a side elevation of a modified form of hub with one of its face-plates removed. Fig. 6 is a section on line 6 6, Fig. 5. Fig. 7 is a transverse section through another modified form of hub; and Fig. 8 is a section on line 8 8, Fig. 7.

Referring to the figures by numerals of reference, 1 is an axle upon which is arranged a box 2, having rings 3 surrounding the same, the inner walls of which are inclined to form an annular dovetail groove 4. This groove is adapted to receive a wedge-shaped bead 5, formed upon the inner surface of a flexible tube 6, and said tube is provided upon its periphery with a series of ears 7, having recesses 8 therein for the purpose hereinafter more fully described.

Face-plates 9 are arranged at opposite sides of the tube 6 and are shaped so as to be normally removed from contact therewith. Each of these face-plates is preferably circular in form and is provided at the center with a tubular extension 10, which is loosely mounted on the box 2 and fits snugly against one of the rings 3. The hub 11 of the wheel is recessed at 12 in the ordinary manner for the reception of spokes 13, and this hub is arranged between the face-plates 9, and the opening 14 at the center thereof is of such size as to permit the tube 6 and its ears to be fitted snugly therein. Recesses 15 are formed within the wall of the opening 14 at intervals, and within each of these openings is secured a coiled spring 16, the outer ends of which project into the recesses 8 in the ear 7 and are secured therein by means of small transversely-extending bolts 17. The springs are also secured in the recesses 15 by means of similar bolts 18.

In assembling the parts herein described the axle is placed within the box 2 and one of the rings 3 secured in position upon one end of the box. The tube 6 is then placed upon the box and the second ring 3 secured in position so as to hold the bead 5 securely clamped between the two rings. One of the face-plates 9 is then placed upon axle 1, and the hub 11 is put in position thereon and around the tube 6. The springs 16 are then fastened within the adjacent ears 7 and recesses 15 by means of the bolts 17 and 18, which are inserted laterally into the apertures provided therefor. Subsequent to this operation the other face-plate 9 is placed on the axle 1, and the two face-plates are then securely held in relation to the hub by means of rings 19, which are fastened in any suitable manner to circular flanges 20, extending from the faces of the hub. These rings overlap the edges of the face-plates and prevent lateral movement thereof without at the same time retarding longitudinal movement of the plates in relation to the hub. Washers 21, of rubber or other material, are placed upon the outer faces of the hub 11 and against the flanges 20, and these washers serve to prevent undue jarring of the parts should the face-plates 9 for any reason be brought in contact with them. In Figs. 5 and 6 I have shown a modified form of hub in which a solid resilient ring is employed in lieu of the tube heretofore described. Referring to said figures, 22 is an axle having a box 23 thereon which is inclosed by a ring 24, of resilient material. This ring has a circular central aperture 25 therein, within which the box 23 is arranged, and recesses 26 are formed within the wall of this aperture for the reception of ears 27, which project in oppositely directions from the box 23. Oppositely-disposed recesses 28 are also formed in the periphery of the disk, preferably in a line at right angles to a line extending through the recesses 26. These recesses are adapted to receive projections 29, which are formed upon the inner wall of a circular aperture 30, formed in the center of the hub 31. Face-plates 33 are arranged upon the box at opposite sides of the hub and disk and are held in position against the faces of the hub by means of rings 32, such as described in connection with the construction illustrated in Figs. 1 to 4.

It will be understood that the springs 16 (shown in Figs. 1 and 4) serve to prevent the tube 6 from rotating within the hub, without at the same time diminishing its resiliency. The projections 27 and 29 (shown in Fig. 5) prevent the hub from turning upon the solid-rubber disk 25.

In Figs. 7 and 8 I have illustrated a further modification. The barrel 34 of the wheel is mounted upon the axle 35 in any desired manner and has an inwardly-extending flange 36 at each end, which overlaps the outer edge of a ring 37, formed on the outer face of a disk 38. These two disks extend between parallel rings 39, which are fastened in any suitable manner to the hub 40, which bears upon ears 41, extending from the periphery of a flexible tube 42. Springs 43 are fastened to the sides of these ears 41, and the other ends of the springs are connected to lugs 44, which project inwardly from the hub 40. Ribs 45 project into the inner surface of the tube 42 from the barrel 34 and serve to form a rigid connection between said barrel and the tube. Oppositely-arranged rings 46 are mounted upon the barrel at opposite sides of the tube and serve to engage the walls of said tube and prevent displacement thereof.

In the foregoing description I have shown the preferred form of my invention; but I do not limit myself thereto, as I am aware that modifications may be made therein without departing from the spirit or sacrificing any of the advantages thereof, and I therefore reserve the right to make such changes as fairly fall within the scope of my invention.

Having thus described the invention, what is claimed as new is—

1. In a device of the character described, the combination with an axle having a box thereon; of a resilient ring surrounding the box and having a recessed portion, a hub having a central aperture within which the ring is located, means extending from the hub and projecting into the recessed portion of the ring for preventing independent movement of the hub and ring, face-plates surrounding the axle and at opposite sides of the hub and ring, rings upon the hub and overlapping the face-plates, and resilient packing upon the hub in alinement with the face-plates.

2. In a device of the character described, the combination with an axle having a box thereon, and a detachable ring upon the box; of a resilient tube surrounding the box, a bead thereon secured to the box, recessed ears integral with the tube, a hub inclosing the tube and having recesses therein, and means for securing the ears to the hub.

3. In a device of the character described, the combination with an axle having a box thereon; of rings detachably connected to the box, a resilient tube surrounding the box, a bead thereon engaged by the rings, recessed ears extending from the tube, a recessed hub inclosing the tube and ears, springs secured at their opposite ends within the recesses in the hub and the ears, respectively, and face-plates surrounding the axle and at opposite sides of the hub.

4. In a device of the character described, the combination with an axle having a box thereon, and detachable rings upon the box; of a resilient tube surrounding the box, a bead thereon engaged by the rings, recessed ears extending from the tube, a hub inclosing the tube and ears and having recesses therein, circular flanges upon the faces of the hub, retaining-rings secured to the flanges, face-plates surrounding the axle at opposite sides of the hub and projecting between the hub and retaining-rings, and springs within the recesses in the hub and ears.

5. In a device of the character described, the combination with an axle having a box thereon, and detachable rings upon the box; of a resilient tube surrounding the box, a bead thereon engaged by the rings, recessed ears extending from the tube, a hub inclosing the tube and ears and having recesses therein, circular flanges upon the faces of the hub, retaining-rings secured to the flanges, face-plates surrounding the axle at opposite sides of the hub and projecting between the hub and retaining-rings, resilient packing in alinement with the face-plates, and coiled springs detachably secured within the recesses in the hub and ears, respectively.

In testimony whereof I affix my signature in presence of two witnesses.

BRENTON B. WEAVER.

Witnesses:
S. EIN,
WILLIAM A. BEGG.